T. F. RATAICZAK.
FINGER GUARD.
APPLICATION FILED NOV. 29, 1920.
1,386,801. Patented Aug. 9, 1921.
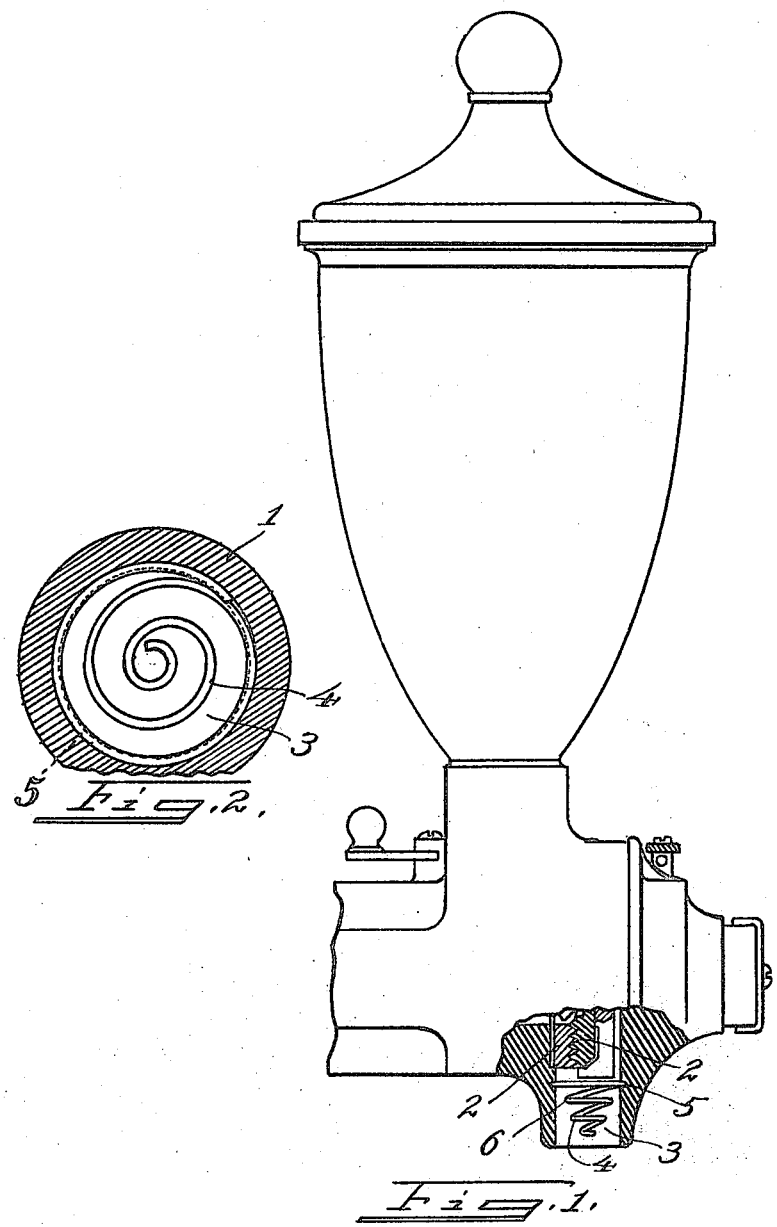
INVENTOR:
Thomas F. Rataiczac.
BY
ATTORNEYS.

UNITED STATES PATENT OFFICE.

THOMAS F. RATAICZAK, OF TROY, OHIO, ASSIGNOR TO THE HOBART MANUFACTURING COMPANY, OF TROY, OHIO, A CORPORATION OF OHIO.

FINGER-GUARD.

1,386,801.  Specification of Letters Patent.  Patented Aug. 9, 1921.

Application filed November 29, 1920. Serial No. 427,146.

*To all whom it may concern:*

Be it known that I, THOMAS F. RATAICZAK, a citizen of the United States, and a resident of Troy, in the county of Miami and State of Ohio, have invented certain new and useful Improvements in Finger-Guards, of which the following is a full, clear, and exact description, reference being had to the accompanying drawings, forming part of this specification.

My invention relates to finger guards for use with coffee mills and other forms of grinders, or like mechanism, wherein it is desirable to permit a flow of material, and still prevent the introduction of the finger to such an extent as to be caught by chopping or grinding teeth or blades, or such other mechanism as is used for the reduction or other treatment of the material.

Among the objects of my invention are the provisions of such a guard which is cheap and permanent, and which will keep clear of clogging while at the same time positively preventing the accidental or purposeful introduction of the finger into operating parts.

I accomplish my objects by that certain construction and arrangement of parts to be hereinafter more specifically pointed out and claimed.

In the drawings, Figure 1 is a side elevation of a coffee grinder showing in broken-away section the guard of my invention. Fig. 2 is bottom plan view showing in detail the coiled spring which forms my guard device.

As shown the coffee grinder 1, is merely selected as one form of mechanism with which my invention can be used to advantage. It has grinding disks 2, 2, and a circular outlet conduit 3.

While my device is shown as mounted in a circular outlet and with a guard of consequent circular conformation, this is not a necessity, since the guard could have any desired form in outline and the conduit have any shape, as will be obvious without illustration.

The guard is formed of a spring 4 wound in a conical helix, in this instance truly conical although it could as well be pyramidal or in other forms to suit different shaped conduits. As a general characteristic form of the spring, it might well be termed a tapering helix since the object is to interpose the coils of the spring from a central point outwardly to the inner dimension of the conduit.

The guard is set into the conduit, in this instance by having its outer coil set into a groove 5 in the face of the conduit, the tension of this outer coil holding the guard firmly in place.

The apex of the guard is lowermost and is left free of attachment, the latter being the essential characteristic as the spring could be inverted without injuriously affecting its functions.

When coffee is ground in the machine, the grains falling through the conduit, tend to scour off other grains by their action on the narrow body of the spring and the freedom of the spring to vibrate at its one end has a readily perceptible and valuable function in jarring particles away from adherence and the building up of bridging walls of the coffee or other material, which would clog the conduit.

It is impossible to insert the finger through the conduit, however, as the helix form of the spring interposes some portion at every point of access. The operator cannot insert his finger or any blunt instrument into the machine when the guard is in place, either on purpose or by accident.

In many forms of grinding machines or choppers and the like the spring form of guard now described not only does not prevent clogging, but has sufficient action to prevent clogging where it might otherwise occur. Furthermore the guard is set entirely within the conduit so as not to be exposed, although this may be departed from without departing from the spirit of my invention.

While I have referred to the conical or tapering helix as the form of spring used as a guard, and this is the preferable form, I do not desire to limit myself in the broad aspects of my invention to any special form of spring. Thus a cylindrical helical spring or a flat coil or spiral, would serve the purposes of my invention to an advantageous degree although the former would tend more to clog, and the latter permit a readier access, than the tapering helix.

Rather than complicate the drawing it will be understood that to form a helical spring, the coil shown in Fig. 1 would be continued down on a uniform radius with that at the point marked 6 on said figure and that with the plain spiral the entire spring would be on the plane of the channeled seat 5.

Having thus described my invention what I claim as new and desire to secure by Letters Patent, is:—

1. A finger guard for conduits in machines of the general character noted, comprising a tapered helix set into said conduit.

2. A finger guard for conduits in machines of the general character noted comprising a tapered helix spring set into said conduits, said helix having an outer dimension approximating the inner dimension of the conduit, and tapered to substantially a central point of the conduit.

3. A finger guard for conduits in machines of the general character noted, comprising a tapered helix spring set into said conduits with its central portion free to vibrate.

4. In a coffee grinder, said grinder having a conduit leading from the grinding mechanism thereof and a conical helix spring set into said conduit, said spring having its central end free, and its widest portion mounted within the walls of said conduit.

5. In a coffee grinder, said grinder having a conduit leading from the grinding mechanism thereof, and a conical helix spring set into said conduit, said spring having its central end free and its widest portion mounted within the walls of said conduit, and the central end depending within the conduit.

6. A finger guard for conduits in machines of the general character noted, comprising a tapered helix set into said conduits, and entirely housed within the walls of said conduit.

7. A finger guard for conduits in machines of the general character noted, comprising a spring of coiled nature, having at least a portion thereof located within the conduit and a portion thereof spaced away from the walls of said conduit.

8. A finger guard for conduit in machines of the general character noted, comprising a spring of coiled nature mounted in the path of material passing out through said conduit, and having a portion thereof positioned inside of the wall line of the conduit so as to interfere with the introduction of objects into the conduit which would be possible of introduction were the spring not present.

THOMAS F. RATAICZAK.